US010613385B2

(12) United States Patent
Chen

(10) Patent No.: US 10,613,385 B2
(45) Date of Patent: Apr. 7, 2020

(54) DISPLAY DEVICE AND METHOD FOR MANUFACTURING THE SAME AND METHOD FOR CONVERTING COLOR GAMUTS OF DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Yifu Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 15/941,346

(22) Filed: Mar. 30, 2018

(65) Prior Publication Data

US 2019/0064596 A1 Feb. 28, 2019

(30) Foreign Application Priority Data

Aug. 31, 2017 (CN) .......................... 2017 1 0776084

(51) Int. Cl.
| | | |
|---|---|---|
| *G02F 1/1335* | (2006.01) | |
| *G02F 1/1343* | (2006.01) | |
| *G02F 1/1339* | (2006.01) | |
| *G02F 1/15* | (2019.01) | |
| G09B 9/30 | (2006.01) | |
| G02F 1/137 | (2006.01) | |
| G02F 1/017 | (2006.01) | |

(52) U.S. Cl.
CPC .... *G02F 1/133609* (2013.01); *G02F 1/13394* (2013.01); *G02F 1/133603* (2013.01);
(Continued)

(58) Field of Classification Search
CPC ........... G09B 9/308; G02F 2001/01791; G02F 1/133602; G02F 1/133603; G02F 1/13762; G02F 1/15; G02F 2001/1502; G02F 2001/1504; G02F 2001/151; G02F 2001/1512
See application file for complete search history.

(56) References Cited

U.S. PATENT DOCUMENTS 5,559,400 A * 9/1996 Nakayama .......... H01L 51/5265
                                                                313/506
9,310,537 B2    4/2016  Jin
(Continued)

FOREIGN PATENT DOCUMENTS

| CN | 103792687 A | 5/2014 |
|---|---|---|
| CN | 105353533 A | 2/2016 |
| WO | 2016154214 A1 | 9/2016 |

OTHER PUBLICATIONS

First Office Action dated May 14, 2019 corresponding to Chinese application No. 201710776084.1 with English Translation.

*Primary Examiner* — Hoan C Nguyen
(74) *Attorney, Agent, or Firm* — Nath, Goldberg & Meyer; Joshua B. Goldberg; Daniel J. Bissing

(57) ABSTRACT

The present disclosure provides a display device and a manufacturing method thereof and a method for converting a color gamut of a display device. The display device comprises a display panel which comprises a display substrate and a plurality of pixel units arranged on a first surface of the display substrate, wherein each pixel unit comprises a plurality of sub-pixels which comprises a variable color sub-pixel used for emitting light of at least one predetermined color according to a predetermined color gamut. Thus, the light of the predetermined color emitted by the variable color sub-pixels can alleviate the phenomenon of color shift of the display device and thereby improve multiple optical properties of the display device, and the display device can meet the requirements of different color gamuts, while not causing lowering of the optical properties.

9 Claims, 7 Drawing Sheets

(52) U.S. Cl.
CPC .. *G02F 1/133617* (2013.01); *G02F 1/134309* (2013.01); *G02F 1/15* (2013.01); *G02F 1/13762* (2013.01); *G02F 1/133602* (2013.01); *G02F 2001/01791* (2013.01); *G02F 2001/133613* (2013.01); *G02F 2001/133614* (2013.01); *G02F 2001/133624* (2013.01); *G02F 2001/134345* (2013.01); *G02F 2001/1502* (2013.01); *G02F 2202/28* (2013.01); *G09B 9/308* (2013.01)

(56) References Cited

U.S. PATENT DOCUMENTS

| | | | |
|---|---|---|---|
| 2002/0025419 A1* | 2/2002 | Lee | H01L 51/504 428/212 |
| 2006/0024512 A1* | 2/2006 | Kishimoto | B32B 3/18 428/447 |
| 2006/0066641 A1 | 3/2006 | Gally et al. | |
| 2006/0175950 A1* | 8/2006 | Itou | B82Y 10/00 313/311 |
| 2006/0262053 A1* | 11/2006 | Lee | G09G 3/3225 345/76 |
| 2008/0252797 A1* | 10/2008 | Hamer | G09G 3/3208 348/802 |
| 2015/0294642 A1* | 10/2015 | Kurokawa | G09G 5/02 345/690 |
| 2016/0335938 A1* | 11/2016 | Bergquist | G09G 3/34 |
| 2016/0351163 A1* | 12/2016 | Liu | G09G 5/02 |

\* cited by examiner

DISPLAY DEVICE AND METHOD FOR MANUFACTURING THE SAME AND METHOD FOR CONVERTING COLOR GAMUTS OF DISPLAY DEVICE

FIELD

The present disclosure relates to the field of display, and particularly relates to a display device and a method for manufacturing the same, as well as a method for converting color gamuts of a display device.

BACKGROUND

The RGBW pixel arrangement liquid crystal display technology is widely applied to display devices having a high resolution more than 4K (UHD) and a large size, so as to greatly improve the transmittance of panels. However, compared with the conventional RGB pixel arrangement products, due to the addition of white pixels, multiple optical properties such as picture display fineness, color purity, color gamut and the like are reduced.

Therefore, it is necessary to research and develop a liquid crystal display device with excellent comprehensive performance.

SUMMARY

In one aspect of the present disclosure, it is to provide a display device. According to an embodiment of the present disclosure, the display device includes a display panel comprising a display substrate and a plurality of pixel units, wherein the plurality of pixel units are arranged on a first surface of the display substrate; each pixel unit includes a plurality of sub-pixels comprising a variable color sub-pixel; and the variable color sub-pixel is used emitting light of at least one predetermined color according to a predetermined color gamut.

According to an embodiment of the present disclosure, the display device further includes at least one exciting light emitting unit, the variable color sub-pixels include a photoluminescent material, and the exciting light emitting unit is used for emitting at least one kind of exciting light to excite the photoluminescent material to emit the light of the at least one predetermined color.

According to an embodiment of the present disclosure, the exciting light emitting unit is at least one micro LED.

According to an embodiment of the present disclosure, the display device further includes an exciting light selecting unit, which is arranged between the exciting light emitting unit and the variable color sub-pixels, or on one side of the variable color sub-pixels opposite to the exciting light emitting unit. The exciting light selecting unit is used for selecting the exciting light according to the light of the at least one predetermined color.

According to an embodiment of the present disclosure, the exciting light selecting unit includes a liquid crystal panel comprising a first electrode, a second electrode, and a liquid crystal layer arranged between the first electrode and the second electrode.

According to an embodiment of the present disclosure, an orthographic projection of the liquid crystal panels on the display substrate covers the plurality of pixel units.

According to an embodiment of the present disclosure, a plurality of liquid crystal panels are provided, and an orthographic projection of each liquid crystal panel on the display substrate covers at least one of the variable color sub-pixels.

According to an embodiment of the present disclosure, the display device further includes a backlight module, and the exciting light emitting unit may be integrally formed with the backlight module.

According to an embodiment of the present disclosure, the plurality of pixel units include a red sub-pixel, a green sub-pixel, a blue sub-pixel and the variable color sub-pixel; or a red sub-pixel, a green sub-pixel, a blue sub-pixel, a yellow sub-pixel and the variable color sub-pixel.

In another aspect of the present disclosure, it is to provide a method for manufacturing the above-mentioned display device.

According to an embodiment of the present disclosure, the method includes a step of forming a display panel which comprises:

providing a display substrate; and forming a plurality of pixel units on a first surface of the display substrate, wherein each pixel unit includes a plurality of sub-pixels which comprises a variable color sub-pixel, and the variable color sub-pixel is used for emitting light of at least one predetermined color according to a predetermined color gamut.

According to an embodiment of the present disclosure, forming the variable color sub-pixels includes: mixing a photoluminescent material with optical adhesive to obtain a raw mixture; and coating the raw mixture on the first surface of the display substrate to form the variable color sub-pixels.

According to an embodiment of the present disclosure, forming the variable color sub-pixels includes: coating a photoluminescent material, or a mixture of the photoluminescent material and a columnar spacer material on the first surface of the display substrate; and coating an optical adhesive successively; so as to form the variable color sub-pixels.

In a further aspect of the present disclosure, it is to provide a method for converting color gamuts of a display device.

According to an embodiment of the present disclosure, the display device includes a display panel comprising a display substrate and a plurality of pixel units, wherein the plurality of pixel units are arranged on a first surface of the display substrate, each pixel unit includes a plurality of sub-pixels comprising a variable color sub-pixel, and the variable color sub-pixel is used for emitting light of at least one predetermined color according to a predetermined color gamut, and the method includes: determining an original color gamut standard and a target color gamut standard of the display device; determining light colors of the variable color sub-pixels according to the original color gamut standard and the target color gamut standard; and exciting the variable color sub-pixels to emit light so as to convert the color gamut standard of the display device from the original color gamut standard to the target color gamut standard.

DETAILED DESCRIPTION OF EMBODIMENTS

Figure 1:
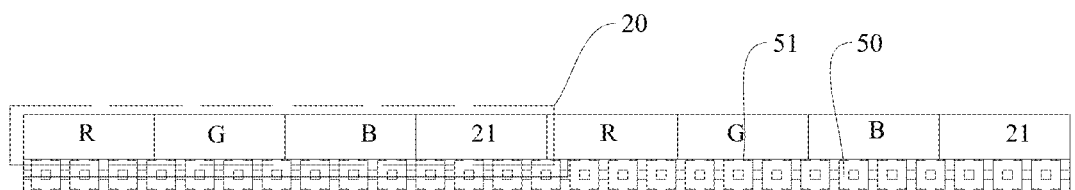
FIG. 1 is a structure diagram of a display panel according to an embodiment of the present disclosure.

The embodiments of the present disclosure will be described in detail below. The embodiments described below are exemplary and used for interpreting the present disclosure only, which should not be understood as limiting the present disclosure. If specific technologies or conditions are not described in the specific embodiments or examples, such embodiments or examples are performed according to the technologies or conditions described in the documents of this field or according to product specifications. The reagents or instruments, in which the manufacturers are not indicated, are all conventional products that can be purchased from the market.

In one aspect of the present disclosure, the present disclosure provides a display device. According to an embodiment of the present disclosure, the display device includes a display panel comprising a display substrate 50 and a plurality of pixel units 20 arranged on a first surface 51 of the display substrate 50, wherein each pixel unit 20 includes a plurality of sub-pixels comprising a variable color sub-pixel 21 which is used for emitting light having at least one predetermined color according to a predetermined color gamut standard, referring to FIG. 1. Thus, the light having predetermined color emitted by the variable color sub-pixels can alleviate the phenomenon of color shift of the display device and thereby improve multiple optical properties of the display device, such as picture display fineness, color purity, color gamut and the like, and the display device can meet the requirements of different color gamut standards. Particularly, when the display device is required to have high resolution and high transmittance, the variable color sub-pixels not only can meet the requirements for high resolution and high transmittance, but also avoid reducing the multiple optical properties such as picture display fineness, color purity, color gamut and the like.

It needs to be noted that the above-mentioned first surface is a surface close to a user when the display device is in use.

According to the embodiment of the present disclosure, the specific category and number of the plurality of sub-pixels in each pixel unit, in addition to the variable color sub-pixel, are not particularly limited and can be flexibly selected by those skilled in the art according to display requirements.

In some embodiments of the present disclosure, the plurality of sub-pixels include a red sub-pixel R, a green sub-pixel G, a blue sub-pixel B and a variable color sub-pixel 21, referring to FIG. 1. In other embodiments of the present disclosure, the plurality of sub-pixels may include a red sub-pixel R, a green sub-pixel G, a blue sub-pixel B, a yellow sub-pixel Y and a variable color sub-pixel 21. Thus, not only the normal display function is guaranteed, but also multiple optical properties of the display device, such as picture display fineness, color purity, color gamut and the like, can be improved. Moreover, the display device can meet the requirements of different color gamut standards.

Unless otherwise specified, the pixel units in the embodiments of the present application and in the drawings of the specification are described by using a pixel unit including a red sub-pixel R, a green sub-pixel G, a blue sub-pixel B and a variable color sub-pixel 21 as an example, which should not be understood as a limitation to the present disclosure.

According to the embodiment of the present disclosure, the predetermined color gamut standard and the predetermined color of the light are not particularly limited. For example, the predetermined color gamut standard may be any color gamut standard known in the art, including but not limited to a DCI color gamut, an Adobe gamut, an NTSC color gamut, a sRGB color gamut, etc. The predetermined color of the light is determined according to the target color gamut standard of the display device, and can be selected by those skilled in the art according to actual needs. For example, if the display device is required to have an NTSC color gamut standard, the light having predetermined color should be such light cooperating with other sub-pixels of the display device that the display device can realize an NTSC color gamut. The light may be red, blue, green or other monochromatic light, or polychromatic light obtained by mixing three primary colors.

According to an embodiment of the present disclosure, the specific method by which the variable color sub-pixels emit light having a predetermined color is not particularly limited as long as the light having the predetermined color can be emitted according to needs. For example, an electroluminescent material may be set in the variable color sub-pixels, and it will emit light having a predetermined color by applying current or voltage; or a photoluminescent material may be set in the variable color sub-pixels, and it will emit light having a predetermined color by applying appropriate exciting light. Of course, other suitable light emitting methods can also be used.

According to some embodiments of the present disclosure, the variable color sub-pixels may include a photoluminescent material, and the display device further includes at least one exciting light emitting unit. The exciting light emitting unit is used for emitting at least one kind of exciting light which excite the photoluminescent material to emit light having at least one predetermined color. Thus, light having a predetermined color that meets the use requirement can be conveniently emitted according to actual needs. In addition, because the photoluminescent material is abundant in source, controllable in light emitting color and low in cost, and facilitates large-scale production.

According to the embodiments of the present disclosure, the kinds of the photoluminescent material is not particularly limited as long as the use requirements can be met, and, and it can be flexibly selected by those skilled in the art according to needs. The photoluminescent material will be described in more detail below.

According to an embodiment of the present disclosure, from the viewpoint of the luminescence mechanism, the photoluminescent material may include at least one of a reflective material, a fluorescent material, a self-luminous body and a phosphorescent material. The fluorescent material may be selected from at least one of inorganic fluorescent materials or organic fluorescent materials.

According to the embodiment of the present disclosure, a luminous body of an inorganic solid luminescent material is composed of a luminescent matrix and a luminescent center, wherein the luminescent center determines luminance, color and the like and thus has an important influence on the luminescent performance of the material. According to an embodiment of the present disclosure, in order to improve the luminescent performance, the performance of the luminescent center may be improved by means of doping. The doping material mainly includes trivalent rare earth ions and transition metal ions, wherein the doped rare earth elements mainly include at least one element of a third subgroup in the periodic table of elements, such as lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu), as well as yttrium (Y) and scandium (Sc) which is closely related to 15 elements of the lanthanide series. Thus, the luminescent performance of the luminescent center can be improved, and the luminance can be further improved.

According to an embodiment of the present disclosure, the luminescent matrix compound used as a photoluminescent material mainly includes a fluoride (an important up-conversion material), an oxide, an oxysalt, a multiple complex system, a luminescent alloy or an organic compound. The cations of the matrix are required to have an inert gas element or closed-shell electronic structure (all electrons in the system are paired in an opposite spin orientation manner to fill some shells, wherein the shell refers to one molecular energy level or two molecular energy levels having the same energy, namely degeneracy two molecular energy levels), and both the cations and anions are optically transparent.

In some embodiments of the present disclosure, the inorganic matrix may be selected from group IA-VIIA compounds (alkali metals and halogen compounds), group IIA-VIA compounds (alkaline earth metal chalcogenide phosphors), group IIB-VIA compounds (compounds of Zn, Cd, Hg with O, S, Se, Te, such as ZnO, ZnS, etc.), group IIIA-VA compounds (compounds of B, Al, Ga, In with N, P, As, Sb), triple compounds (rare earth oxysulfide, e.g., $Y_2O_2S$, rare earth halides, complex oxides, thiogallates, ternary halides), polycompounds with complex structures, oxides ($Y_2O_3$, $Gd_2O_3$, etc.), oxysalts (halophosphates, silicates, halates, germanates, tungstates, phosphates, vanadates, borates, etc.), etc. Thus, the material source is abundant with wide selectivity and low cost, and the luminescent effect of the photoluminescent material can be improved.

According to an embodiment of the present disclosure, the photoluminescent material may include an up-conversion luminescent material and a down-conversion luminescent material in view of conversion luminescence, wherein the up-conversion luminescent material may be excited by the light with a long wavelength and a low frequency to emit light with a short wavelength and a high frequency, and the down-conversion luminescent material may be excited by the light with a short wavelength and a high frequency to emit light with a long wavelength and a low frequency. In some embodiments of the present disclosure, the conversion luminescence material is not particularly limited, and either the down-conversion luminescent material or the up-conversion luminescent material may be selected. In some embodiments of the present disclosure, the down-conversion material, such as $(Y,Gd)BO_3:Er^{3+}$ (which could emit red light having a wavelength range of approximately 650-700 nm under the excitation of 147 nm exciting light) may be selected. In other embodiments of the present disclosure, the photoluminescent material may be the up-conversion material, such as $Ba_5Gd_8Zn_4O_{21}$:5% $Er^{3+}$ or 12% $Yb^{3+}$ which may emit red light (650-700 nm) under the excitation of 980 nm exciting light. Of course, other photoluminescent materials may also be selected so that the photoluminescent material emits light having a desired color.

It is well known to those skilled in the art that the photoluminescent material may exist in diverse forms. The disclosure has no intention to limit the form of the photoluminescent material. The available forms of the photoluminescent material include, but are not limited to, at least one of powder luminescent materials, glass luminescent materials, single crystal luminescent materials or thin-film luminescent materials.

According to an embodiment of the present disclosure, it is preferred to select a photoluminescent material which is transparent or nearly transparent in the absence of exciting light, so that the variable color sub-pixels are used as transparent sub-pixels when it is not excited to achieve a high transmittance ratio and can emit light of a predetermined color according to a predetermined color gamut standard when it is excited to make the display device satisfy different color gamut requirements and improve picture fineness, color purity and other optical performance of the display device.

According to an embodiment of the present disclosure, since the display backlight of the display device generally has a wavelength of 380 to 780 nm, it is preferred to select a photoluminescent material having a exciting light band within the non-visible light band in order to not produce a negative influence on the display function of the display device. The photoluminescent material only absorbs the exciting light of the non-visible light band, and does not absorb the display backlight of the visible light band, so the brightness, light utilization rate and the like properties of the display device are not affected.

According to an embodiment of the present disclosure, in order to achieve the variable color sub-pixels emitting light of at least one predetermined color, one or more photoluminescent materials may be set in the variable color sub-pixels. Specifically, when light having one predetermined color needs to be emitted, one or more photoluminescent materials may be set in the variable color sub-pixels, and emit the light having the predetermined color under the appropriate exciting light; when light of multiple predetermined colors needs to be emitted, one or more photoluminescent materials may be set in the variable color sub-pixels, wherein one photoluminescent material may emit light having multiple colors under the different exciting light, or the two or more photoluminescent materials may emit light having different colors under the appropriate exciting light respectively.

According to an embodiment of the present disclosure, the type, quantity and the location of the exciting light emitting units are not particularly limited as long as appropriate exciting light can be provided for all the variable color sub-pixels as necessary. In some embodiments of the present disclosure, the exciting light emitting unit may be a bulb, an LED (light emitting diode), a hot cathode fluorescent tube, a cold cathode fluorescent tube, a flat fluorescent lamp, an electroluminescent sheet, an organic electroluminescent sheet, etc. In some embodiments of the present disclosure, the exciting light emitting unit may be a plurality of micro LEDs. Thus, the wavelength of the exciting light may be controlled independently and adjusted more flexibly.

In some embodiments of the present disclosure, there may be one exciting light emitting unit, and the exciting light emitted by it may irradiate all the variable color sub-pixels. In other embodiments of the present disclosure, there may be plurality of exciting light emitting units, the exciting light emitted by each exciting light emitting unit may irradiate part of the variable color sub-pixels, and the exciting light emitted by the plurality of exciting light emitting units may irradiate all the variable color sub-pixels. In some other embodiments of the present disclosure, the quantity of the exciting light emitting units is the same as that of the variable color sub-pixels, and the exciting light emitted by each exciting light emitting unit may irradiate one variable color sub-pixel.

Figure 2:
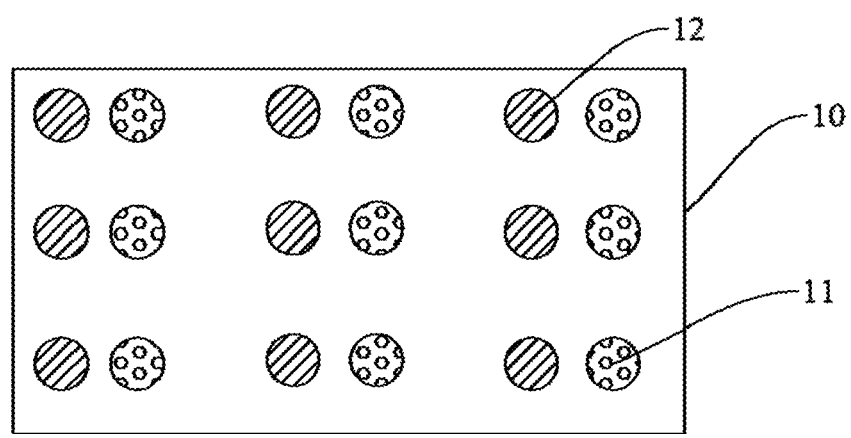
FIG. 2 is a structure diagram of a backlight module according to another embodiment of the present disclosure.
Figure 3:
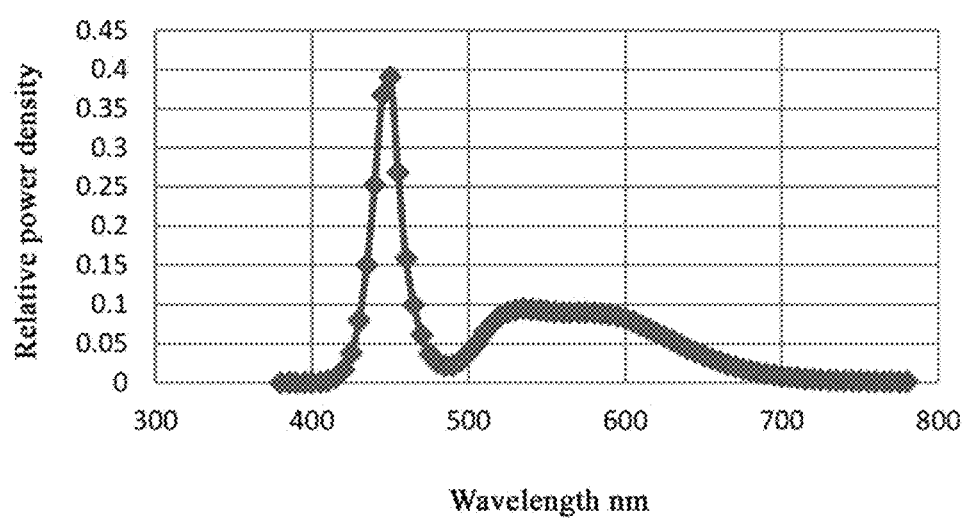
FIG. 3 is a spectrogram of display backlight according to an embodiment of the present disclosure.
Figure 4:
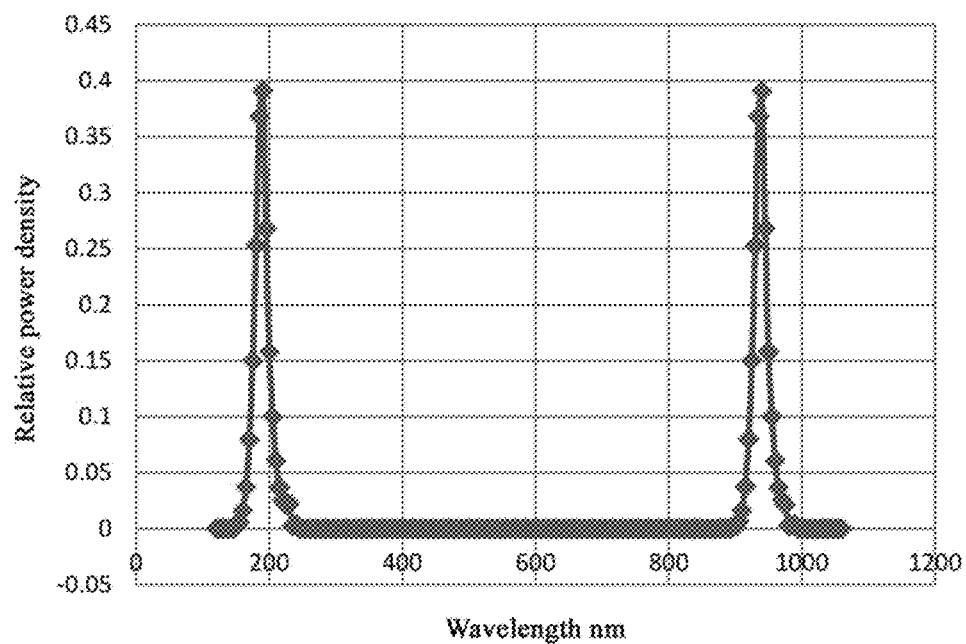
FIG. 4 is a spectrogram of emergent light of an exciting light emitting unit according to an embodiment of the present disclosure.
Figure 5:
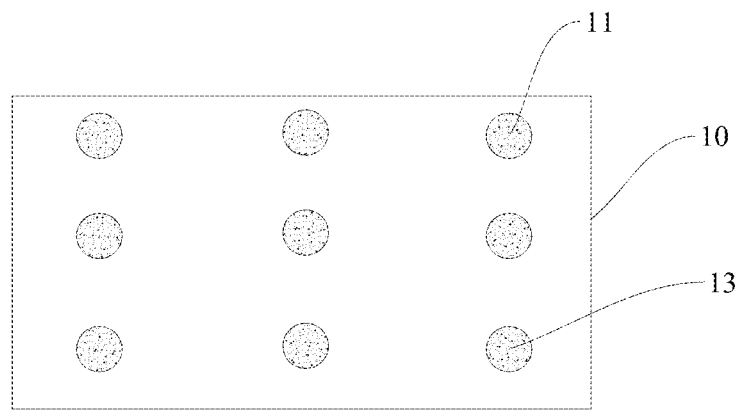
FIG. 5 is a structure diagram of a backlight module according to an embodiment of the present disclosure.
Figure 6:
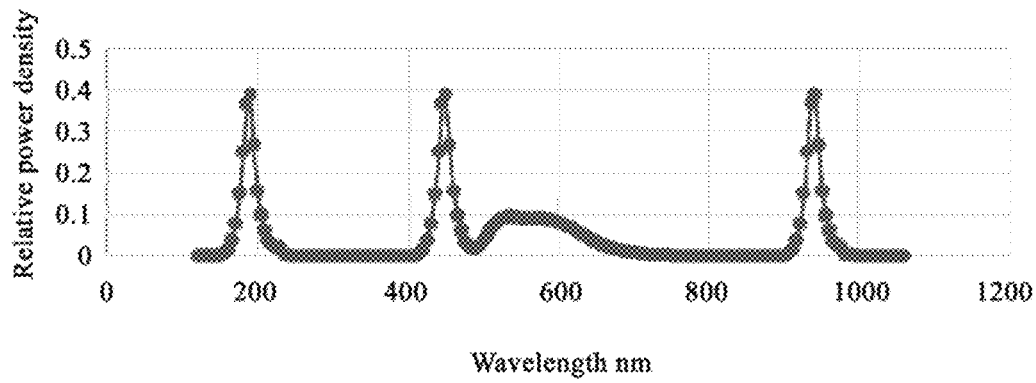
FIG. 6 is a spectrogram of emergent light of a composite light source in the backlight module according to an embodiment of the present disclosure.
Figure 7:
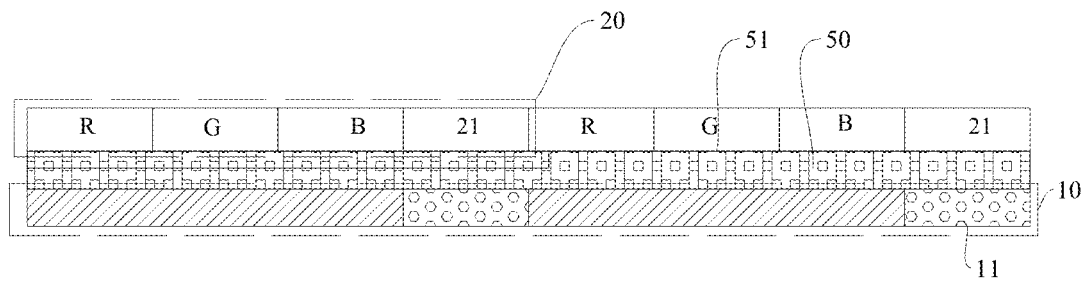
FIG. 7 is a structure diagram of a display device according to another embodiment of the present disclosure.

According to an embodiment of the present disclosure, the exciting light emitting unit may be arranged on one side of the display substrate opposite to the first surface in order to ensure a good excitation effect. Thus, the light utilization rate is high, the excitation effect is ideal, and no negative influence is produced on the display function of the display device. According to an embodiment of the present disclosure, the exciting light emitting unit is integrally formed with the backlight module of the display device in order to further simplify the structure and the manufacturing process. Specifically, referring to FIG. 2, in addition to a light source 12 providing display backlight (see FIG. 3 for the spectra), a light source providing exciting light (see FIG. 4 for the spectra) may be additionally arranged in the backlight module 10 to constitute the exciting light emitting unit 11. Referring to FIG. 5, a composite light source 13 (see FIG. 6 for the spectra of emergent light) may also be arranged in the backlight module 10 to constitute the exciting light emitting unit 11, so that the light emitted by the composite light source includes both backlight and exciting light. According to some embodiments of the present disclosure, referring to FIG. 7 of a structure diagram of the backlight module 10, the exciting light emitting unit 11 is arranged in the backlight module 10. Thus, the display device is simple in structure and easy to manufacture, and the thickness of the display device is not increased.

According to an embodiment of the present disclosure, the exciting light also needs to be adjusted in order to meet different luminescent requirements of the photoluminescent material, and the exciting light emitting unit according to the embodiment of the present disclosure may emit at least one kind of exciting light. Specifically, when only one kind of exciting light needs to be emitted, the exciting light emitting unit may be one or more light sources emitting only one kind of exciting light; when multiple different kinds of exciting light need to be emitted, the exciting light emitting unit may be one light source that can simultaneously emit different kinds of exciting light, or multiple light sources, each of which can emit only one kind of exciting light. Further, when different kinds of exciting light need to be emitted, the exciting light emitting unit may be multiple light sources emitting different exciting light. Preferably, the exciting light of different bands emitted by the light sources is required to have high separation of wavelength and no overlap, and is distributed in invisible bands such as infrared wavelength bands (0.78-300 μm) or ultraviolet wavelength bands (0.01-0.38 μm). Thus, the exciting light of multiple bands and the display backlight of the display device do not affect each other in order to ensure good functions of each.

According to an embodiment of the present disclosure, in order to make a display device satisfy different color gamut standards, the variable color sub-pixels need to emit light of different colors under different color gamut standards, and accordingly the exciting light emitting unit may need to provide exciting light of different bands for the photoluminescent material under different conditions. Thus, the exciting light emitting unit needs to be controlled to provide appropriate exciting light according to different operating requirements.

According to some embodiments of the present disclosure, the exciting light emitting unit may be controlled by three methods to select the exciting light: 1, the exciting light emitting unit adopts light sources of which the on and off and exciting light wavelengths can be independently controlled; 2, the exciting light emitting unit adopts a light source capable of simultaneously emitting exciting light of multiple bands, and an exciting light selecting unit is provided to effectively select the exciting light; and 3, a local backlight module adjustment technology is used in combination with one of the above two methods to effectively select the exciting light. These methods will be described in detail below.

According to an embodiment of the present disclosure, when the above-mentioned first control method of the exciting light emitting unit is adopted, the exciting light emitting unit may be a plurality of light sources that are independently turned on and off and emit exciting light of different bands, for example, may be a plurality of micro LEDs. Thus, on and off of each micro LED and the wavelength of the exciting light emitted by it can be independently controlled. For example, the plurality of micro LEDs can emit exciting light of different bands respectively, and when exciting light of a single band is required, only the micro LED emitting the exciting light of the corresponding band can be turned on to provide the exciting light for the photoluminescent material, and other micro LEDs are turned off; when exciting light of multiple different wavelengths is required at the same time, a plurality of micro LEDs emitting the exciting light of the corresponding wavelengths can be turned on.

According to an embodiment of the present disclosure, when the above-described second control method of the exciting light emitting unit is adopted, the display device may further include an exciting light selecting unit, which is used for selecting exciting light according to the light of a predetermined color. According to the embodiments of the present disclosure, the specific type, arrangement mode and the like of the exciting light selecting unit are not particularly limited, as long as the exciting light can be effectively selected, so that the display device reaches the desired color gamut standard.

Figure 8:
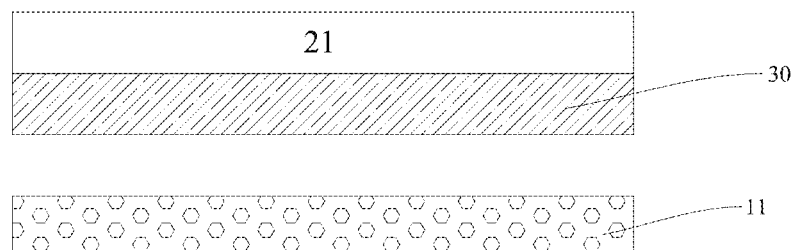
FIG. 8 is a structure diagram of a display device according to another embodiment of the present disclosure.
Figure 9:
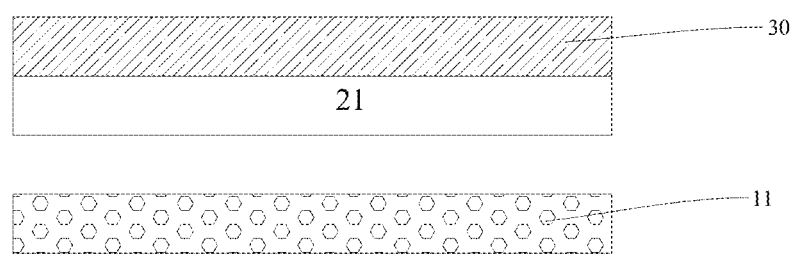
FIG. 9 is a structure diagram of a display device according to another embodiment of the present disclosure.

In some embodiments of the present disclosure, referring to FIG. 8, the exciting light selecting unit 30 is arranged between the exciting light emitting unit 11 and the variable color sub-pixel 21, and thus, the exciting light selecting unit 30 can select the exciting light of multiple different bands emitted by the exciting light emitting unit, i.e. only allow the exciting light of the desired band to pass and block the exciting light of other bands. In other embodiments of the present disclosure, referring to FIG. 9, the exciting light selecting unit 30 may be arranged on one side of the variable color sub-pixel 21 opposite to the exciting light emitting unit 11, thus, the exciting light of multiple different bands emitted by the exciting light emitting unit can arrive at the variable color sub-pixel, the photoluminescent material can absorb the exciting light of proper bands to emit light of a predetermined color. Then, when the light of the predetermined color and the exciting light of other bands pass through the exciting light selecting unit, the exciting light selecting unit only allows the light of the predetermined color to pass and blocks the exciting light of the other bands. Thus, the exciting light of the required band can be easily selected, so that the variable color sub-pixel emits light having a predetermined color as desired, and multiple optical properties such as picture display fineness, color purity, color gamut and the like are improved.

Figure 10:
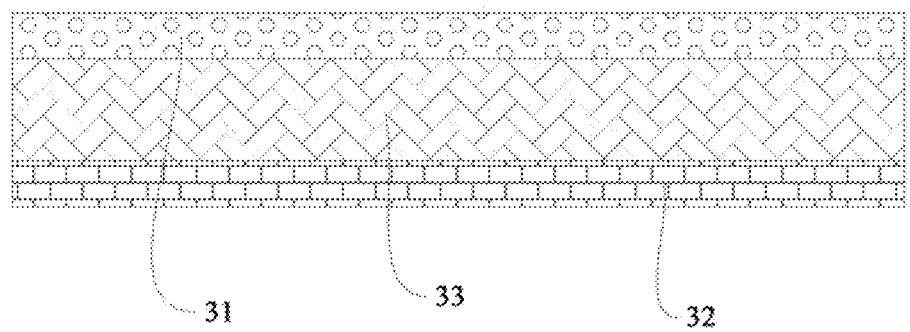
FIG. 10 is a structure diagram of a liquid crystal panel according to another embodiment of the present disclosure.

According to an embodiment of the present disclosure, referring to FIG. 10, the exciting light selecting unit 30 may include a liquid crystal panel 60 comprising a first electrode 31, a second electrode 32, and a liquid crystal layer 33 arranged between the first electrode 31 and the second electrode 32. Thus, different voltages may be applied to the liquid crystal layer to adjust the exciting light. Specifically, a predetermined voltage is applied to the liquid crystal panel, to allow the display backlight required for normal display and the exciting light for exciting the photoluminescent material to emit light of a predetermined color to pass, thereby improving multiple optical properties such as picture display fineness, color purity, color gamut and the like of the display device while ensuring the normal display.

Figure 11:
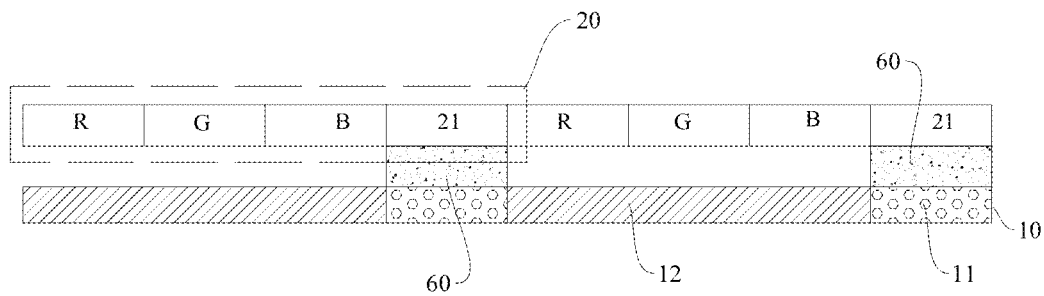
FIG. 11 is a structure diagram of a display device according to another embodiment of the present disclosure.

According to the embodiment of the present disclosure, the arrangement mode of the liquid crystal panel is not particularly limited as long as the exciting light emitted by the exciting light emitting unit can be effectively selected. In some embodiments of the present disclosure, an entire liquid crystal panel may be provided, that is, an orthographic projection of the liquid crystal panel on the display substrate covers the plurality of pixel units of the display device. Thus, the light emitted by the backlight module needs to pass through the liquid crystal panel before arriving at human eyes, and the liquid crystal panel can be controlled to allow the display backlight and the required exciting light to pass and filter other light. In other embodiments of the present disclosure, a plurality of liquid crystal panels may be provided, and an orthographic projection of each liquid crystal panel on the display substrate covers at least one of the variable color sub-pixels. Specifically, the display device may be divided into a plurality of predetermined areas, a liquid crystal panel is arranged in each predetermined area, and an orthographic projection of the liquid crystal panel on the display substrate at least covers the variable color sub-pixels in the predetermined area, wherein the above-mentioned division method of the predetermined areas is not particularly limited, and can be flexibly selected by those skilled in the art according to needs, for example, a predetermined area may include a plurality of pixel units, or only one pixel unit, or only one sub-pixel, that is, the liquid crystal panels may be correspondingly provided according to the quantity of the variable color sub-pixels, and an orthographic projection of each liquid crystal panel on the display substrate covers one variable color sub-pixel (see FIG. 11 for the structure diagram).

According to an embodiment of the present disclosure, in view of the machining difficulty in the manufacturing and assembly process, preferably an entire liquid crystal panel is arranged in the display device as the exciting light selection unit, i.e., an orthographic projection of the entire liquid crystal panel on the display substrate covers all the pixel units. In this case, since all the light emitted by the backlight module needs to pass through the liquid crystal panel, it needs to pay special attention that the liquid crystal panel is not allowed to produce a negative influence on the display backlight. In this regard, in some embodiments of the present disclosure, referring to FIGS. 12 and 13, the above-mentioned entire liquid crystal panel is divided into a plurality of first adjustment light units 61 and second adjustment light units 62, wherein an orthographic projection of each first adjustment light unit 61 on the display substrate covers one variable color sub-pixel, and an orthographic projection of each second adjustment light unit 62 on the display substrate covers at least one other sub-pixel (a sub-pixel other than the variable color sub-pixel). Thus, the liquid crystal panel can be controlled so as not to affect the display backlight emitted by the backlight module, but to select the exciting light only.

Figure 12:
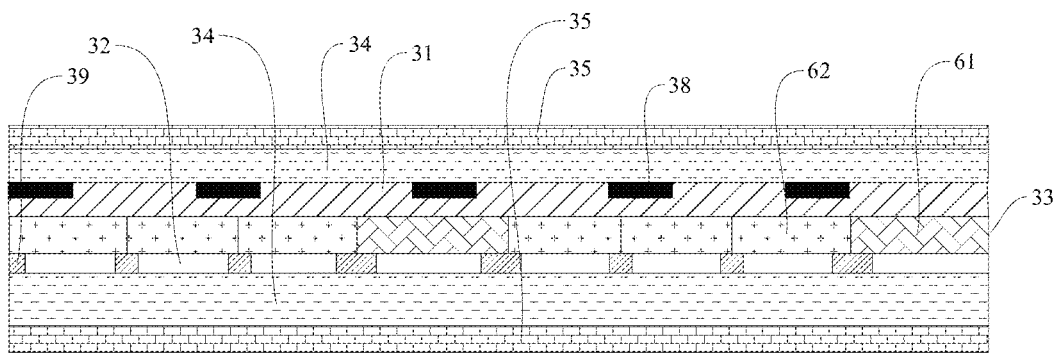
FIG. 12 is a structure diagram of a liquid crystal panel according to another embodiment of the present disclosure.
Figure 13:
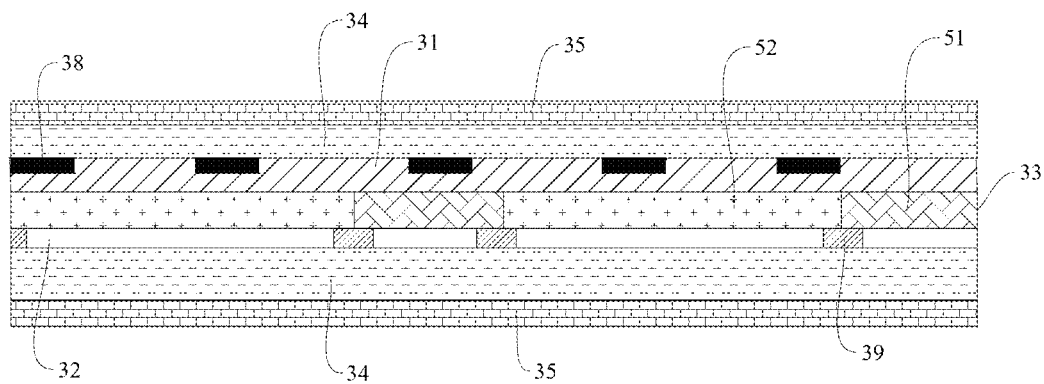
FIG. 13 is a structure diagram of a liquid crystal panel according to another embodiment of the present disclosure.

According to an embodiment of the present disclosure, in order to further improve the function of the liquid crystal panel and enable it to cooperate with other structural components of the display device, the liquid crystal panel 60 described above further includes a glass substrate 34, a polarizer 35, black matrices 38 and data wires 39, as shown in FIGS. 12 and 13. Thus, it can function better.

Figure 14:
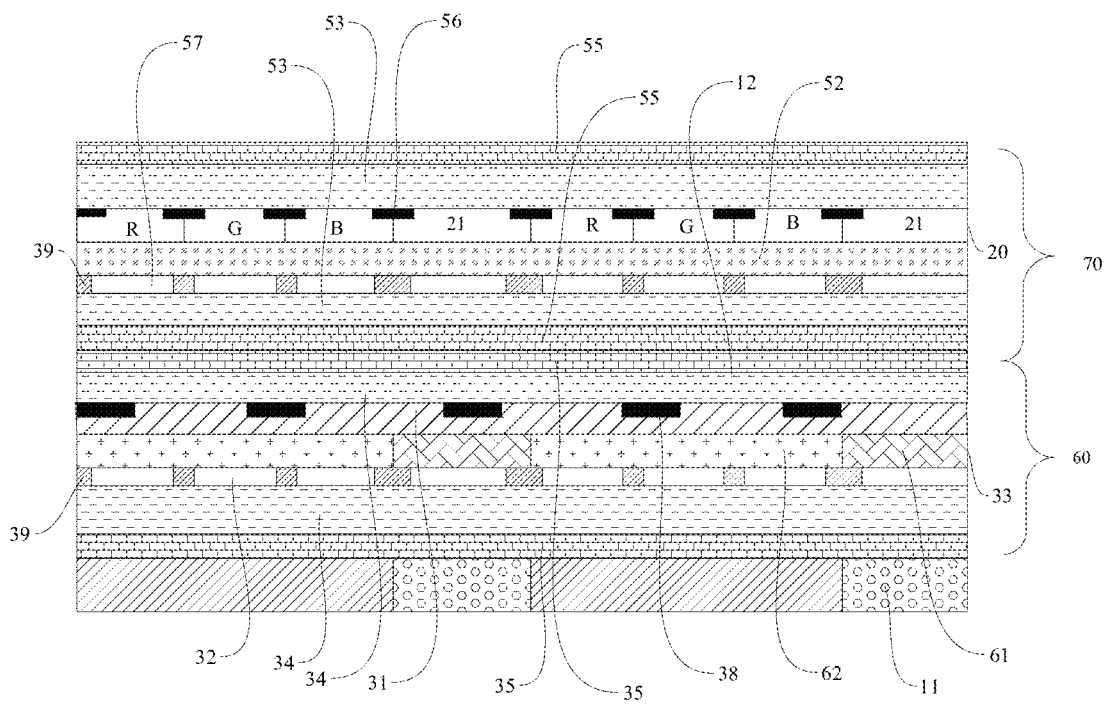
FIG. 14 is a structure diagram of a display device according to another embodiment of the present disclosure.
Figure 15:
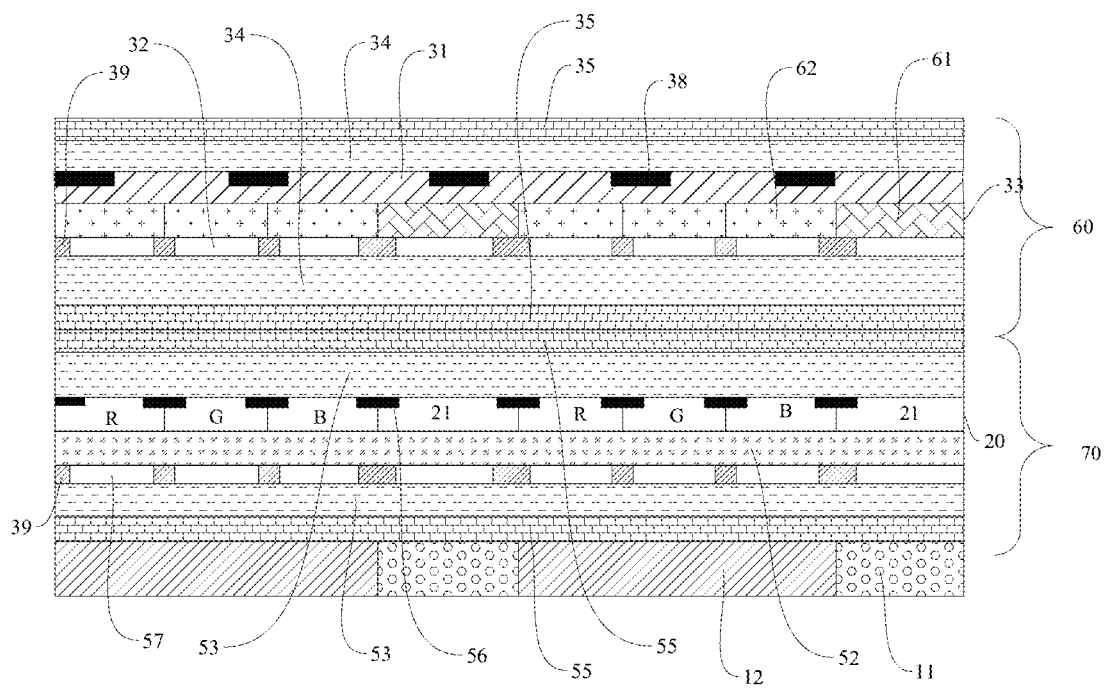
FIG. 15 is a structure diagram of a display device according to another embodiment of the present disclosure.

According to an embodiment of the present disclosure, the liquid crystal panel may be arranged between the display panel and the backlight module as shown in FIG. 14, or the liquid crystal panel may be arranged on one side of the display panel opposite to the backlight module as shown in FIG. 15. In either case, the two polarizers in contact with each other of the liquid crystal panel and the display panel can exist at the same time, or any one of the two polarizers may be omitted, so that the liquid crystal panel and the display panel share one polarizer. Description will be given as below with reference to FIG. 15. The lower polarizer 35 (the polarizer 35 on the side close to the display panel 70) of the liquid crystal panel 60 can be omitted. Under such case, if the absorption axes of the upper polarizer 55 (the polarizer on the side close to the liquid crystal panel 60) of the display panel 70 and the upper polarizer 35 (the polarizer on the side opposite to the display panel 70) of the liquid crystal panel 60 are consistent in direction (i.e., the absorption axes are parallel), the liquid crystal panel 60 is in a normally white mode; and if the absorption axes of the upper polarizer 55 (the polarizer on the side close to the liquid crystal panel 60) of the display panel 70 and the upper polarizer 35 (the polarizer on the side opposite to the display panel 70) of the liquid crystal panel 60 are perpendicular, and the liquid crystal panel 60 is in a normally black mode. In some embodiments of the present disclosure, the normally white mode is preferred, thereby saving more power than the normally black mode.

It could be understood by those skilled in the art that, the display panel 60 further includes a glass substrate 53, black matrices 56, data wires 39, transparent electrodes 57 and a liquid crystal layer 52, as shown in FIGS. 14 and 15. Thus, it can function better.

According to an embodiment of the present disclosure, the resolutions of the display panel 70 and the liquid crystal panel 60 are close or the same, preferably the same. Thus, the variable color sub-pixels can be controlled more accurately to minimize the loss of transmittance due to the metal traces blocking the open area.

In some embodiments of the present disclosure, a local backlight adjustment technology can also be used in conjunction with the exciting light emitting unit. In the local backlight adjustment technology can individually control the exciting light emitting units in the backlight module or collectively control the exciting light emitting unit and the light source of display backlight to realize local control of the backlight source, that is, in the local backlight adjustment technology, the exciting light emitting unit and the light source of display backlight in the backlight module can be turned on or off according to the a matched timing sequence and matched area of output pictures.

Described below is an example that the display panel 70 and the liquid crystal panel 60 are used in combination and the liquid crystal panel adopts the normally black mode and a green enhanced mode (i.e., the variable color sub-pixels emit green light), wherein it needs to be noted that when the display picture needs to be lightened by the green sub-pixels, the variable color sub-pixels need to emit green light due to some deviation to enhance green; whereas if the display picture does not need to be lightened by the green sub-pixels, correspondingly, the variable color sub-pixels do not need to emit green light. Based on this, whether the variable color sub-pixels need to be excited to emit light can be judged according to whether the green sub-pixels of the display panel light up. Specifically, data is analyzed according to the display picture. After the green sub-pixel lighting area and the lighting timing sequence of the display panel are processed by a signal data analysis and storage module, the exciting light emitting unit is turned on according to the matched area and timing sequence, the display panel can emit light, and the photoluminescent material in the variable color sub-pixels is excited; the information of the analysis and storage module is subjected to temporal and spatial processing and then output to a timing controller of the liquid crystal panel, the corresponding area of the liquid crystal panel is turned on (i.e., the liquid crystal panel functions to adjust light), the light transmittance of the liquid crystal panel can be adjusted through the voltage change according to the green intensity of the original picture, and the exciting light is seen by human eyes through the liquid crystal panel. Since the intensity of green light generated by the exciting light is added, if the green brightness in the display panel is maintained, it will inevitably affect the color mixing. At this time, the display panel correspondingly adjusts the transmittance of the green sub-pixels according to the picture compensation data, thereby achieving a picture compensation effect. As the light emitted by the photoluminescent material is generated by energy level transition, the frequency is often fixed and the color purity is extremely high. By adding the green component with relatively high purity, the original color gamut of the display panel is greatly improved. When the color gamut does not need to be changed, the exciting light emitting units in the backlight module can be all turned off (i.e., the exciting light emitting units do not emit light), and all adjustment light units of the liquid crystal panel are remained off (i.e., the liquid crystal panel does not adjust light), and the color gamut at this time is the original color gamut of the display panel.

Figure 16:
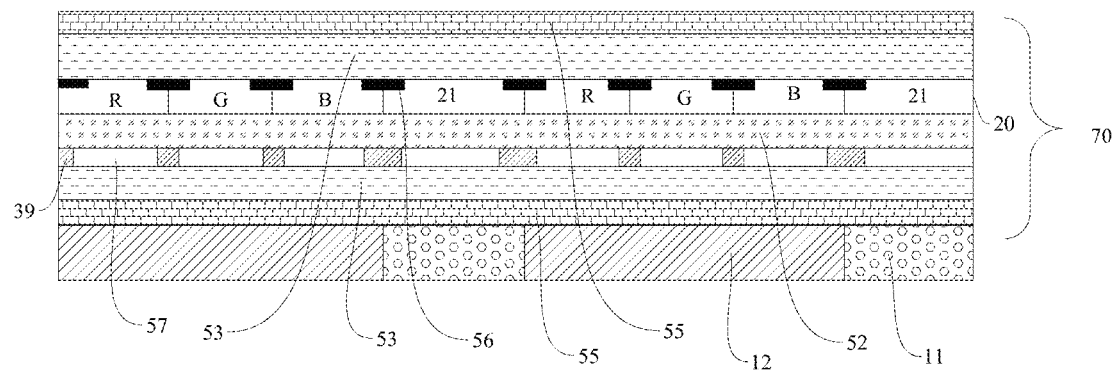
FIG. 16 is a structure diagram of a display device according to another embodiment of the present disclosure.

According to a specific embodiment of the present disclosure, referring to FIG. 16, the display device includes a backlight module 10 and a display panel 70, wherein the backlight module includes a light source 12 of display backlight and an exciting light emitting unit 11; and the display panel includes: a polarizer 55 arranged on one side of the backlight module, a glass substrate 53 arranged on one side of the polarizer opposite to the backlight module, electrodes 57 and data wires 38 arranged in a staggered manner on one side of the glass substrate opposite to the backlight module, a liquid crystal layer 52 arranged on one side of the electrodes opposite to the backlight module, a plurality of pixel units 20 arranged on one side of the liquid crystal layer opposite to the backlight module, black matrices 56 arranged in an array manner on one side of the pixel units opposite to the backlight module, a glass substrate 53 arranged on one side of the pixel units opposite to the backlight module and covering the black matrices, and a polarizer 55 arranged on one side of the glass substrate opposite to the backlight module.

According to another specific embodiment of the present disclosure, referring to FIG. 15, the display device includes a backlight module 10, a liquid crystal panel 60 and a display panel 70 arranged between the backlight module 10 and the liquid crystal panel 60, wherein the backlight module includes a light source 12 of display backlight and an exciting light emitting unit 11; the display panel includes: a polarizer 55 arranged on one side of the backlight module, a glass substrate 53 arranged on one side of the polarizer opposite to the backlight module, electrodes 57 and data wires 38 arranged in a staggered manner on one side of the glass substrate opposite to the backlight module, a liquid crystal layer 52 arranged on one side of the electrodes opposite to the backlight module, a plurality of pixel units 20 arranged on one side of the liquid crystal layer opposite to the backlight module, black matrices 56 arranged in an array manner on one side of the pixel units opposite to the backlight module, a glass substrate 53 arranged on one side of the pixel units opposite to the backlight module and covering the black matrices, and a polarizer 55 arranged on one side of the glass substrate opposite to the backlight module; and the liquid crystal panel includes: a polarizer 35 arranged on one side of the polarizer 55 of the display panel opposite to the backlight module, a glass substrate 34 arranged on one side of the polarizer 35 opposite to the backlight module, second electrodes 32 and data wires 38 arranged in a staggered manner on one side of the glass substrate opposite to the backlight module, a liquid crystal layer 32 arranged on one side of the second electrodes opposite to the backlight module, a first electrode 31 arranged on one side of the liquid crystal layer opposite to the backlight module, black matrices 38 arranged in an array manner on one side of the first electrode opposite to the backlight module, a glass substrate 34 arranged on one side of the first electrode opposite to the backlight module and covering the black matrices, and a polarizer 35 arranged on one side of the glass substrate opposite to the backlight module, wherein an orthographic projection of each second light adjustment unit 62 in the liquid crystal layer on the display substrate covers one other sub-pixel (a sub-pixel other than the variable color sub-pixel).

According to another specific embodiment of the present disclosure, referring to FIG. 14, the display device includes a backlight module 10, a display panel 70 and a liquid crystal panel 60 arranged between the backlight module 10 and the display panel 70, wherein the specific structures of the backlight module, the display panel and the liquid crystal panel are the same as the structures in FIG. 15 described above, except that an orthographic projection of each second light adjustment unit 62 of the liquid crystal panel on the display substrate covers three RGB sub-pixels.

According to the embodiments of the present disclosure, the type of the display device is not particularly limited, and the display device may be any device or equipment with a display function in the art, for example, including but not limited to a mobile phone, a tablet computer, a computer display, a game machine, a television, a display screen, wearable equipment and other life appliance or home appliance with a display function, etc.

Certainly, it could be understood by those skilled in the art that, in addition to the backlight module, the pixel units and the like described above, the display device of the present disclosure may further include necessary structures and components of a conventional display device. Using a mobile phone as an example for illustration, in addition to the backlight module, the pixel unit and other structures described above, it may further include structures and components of a conventional mobile phone, such as a touch screen, a housing, a CPU, a camera module, a fingerprint identification module, a sound processing system, etc.

In another aspect of the present disclosure, the present disclosure provides a method for manufacturing the display device. According to an embodiment of the present disclosure, the method includes a step of forming a display panel, and the step of forming the display panel includes: providing a display substrate; and forming a plurality of pixel units on the first surface of the display substrate, wherein each pixel unit includes a plurality of sub-pixels, the plurality of sub-pixels include a variable color sub-pixel, and the variable color sub-pixel is used for emitting light of at least one predetermined color according to a predetermined color gamut standard. Thus, multiple optical properties such as display picture fineness, color purity, color gamut and the like can be improved, and the manufacturing method is simple and low in cost and facilitates industrialized production.

It could be known by those skilled in the art that the pixel units are usually arranged on a color filter substrate, the color filter substrate generally includes a glass substrate, pixel units (including a plurality of sub-pixels) arranged on the glass substrate, black matrices and an optical adhesive layer, and the forming method often includes: forming black matrices on one side of the glass substrate, forming sub-pixels at the gaps between the black matrices, and then forming an optical adhesive layer. Only the specific step of forming the variable color sub-pixels will be described below.

Figure 17:
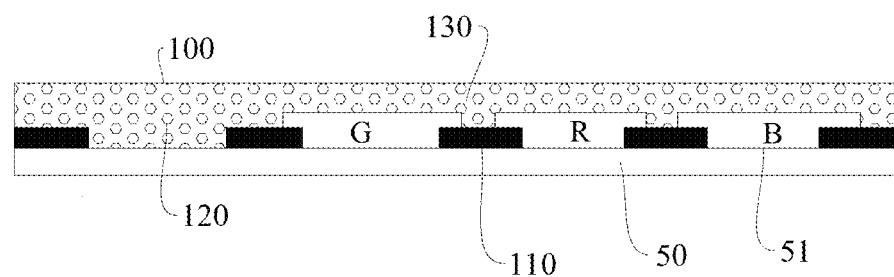
FIG. 17 is a structure diagram of variable color sub-pixels manufactured according to another embodiment of the present disclosure.

According to an embodiment of the present disclosure, referring to FIG. 17, the step of forming the variable color sub-pixels may include: mixing a photoluminescent material 120 with optical adhesive 130 to obtain a raw mixture 100; and coating the raw mixture 100 on the first surface 51 of the display substrate 50 to form the variable color sub-pixels.

According to an embodiment of the present disclosure, referring to FIG. 17, when the photoluminescent material 120 is not excited by visible light, the optical adhesive 130 may be integrally formed with the variable color sub-pixels.

Figure 18:
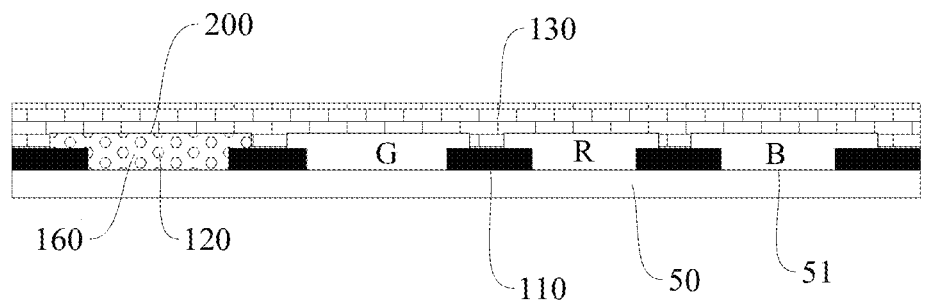
FIG. 18 is a structure diagram of variable color sub-pixels manufactured according to another embodiment of the present disclosure.

According to an embodiment of the present disclosure, referring to FIG. 18, the step of forming the variable color sub-pixels may include: coating a photoluminescent material 120, or a mixture of the photoluminescent material 120 and a columnar spacer material 160 (also referred to as a PS material) on the first surface 51 of the display substrate 50, and coating optical adhesive 300 on the first surface 51 of the display substrate 50 successively to form the variable color sub-pixels.

In a further aspect of the present disclosure, the present disclosure provides a method for converting color gamut standards of a display device. According to an embodiment of the present disclosure, the display device includes a display panel comprising a display substrate and a plurality of pixel units, the plurality of pixel units are arranged on a first surface of the display substrate, each pixel unit includes a plurality of sub-pixels comprising a variable color sub-pixel which is used for emitting light having at least one predetermined color according to a predetermined color gamut standard, and the method described above includes: determining an original color gamut standard and a target color gamut standard of the display device; determining the color of the light emitting by the variable color sub-pixels according to the original color gamut standard and the target color gamut standard; exciting the variable color sub-pixels to emit the desired light, and converting the color gamut standard of the display device from the original color gamut standard to the target color gamut standard. According to the requirement of the target color gamut, the variable color sub-pixels are excited to emit light of a required color, then conversion between different color gamut standards is realized, and the technical effect of improving multiple optical properties such as picture display fineness, color purity, color gamut and the like is achieved.

It is well known by those skilled in the art that the color gamut of the display panel is usually related to the backlight module and color resistance spectra. For a finished optical adhesive with determined color resistance material and color resistance thickness, the distribution of the color resistance spectra thereof is fixed. In the development process of the backlight module, when the selection of the LED lamp group is fixed, the spectrum distribution of the backlight module is fixed. When the optical adhesive with fixed color resistance spectrum distribution is used in combination with the backlight with specific backlight module spectra, the color gamut will be fixed and cannot be changed, and this is the original color gamut standard of the display device. For the display device of the present disclosure, when the variable color sub-pixels are transparent sub-pixels (i.e., the luminescent material of the variable color sub-pixels is not excited), its color gamut is the original color gamut standard.

According to the positioning of different products, different original color gamuts can be selected. If the display device is used as a TV, the original color gamut is set according to the basic requirement of the common TV for the color gamut, for example, the color gamut of some TV products is required to be SRGB>99%, the color gamut of some products is required to be DCI>86% and the like, all the above color gamuts may be used as the original color gamut standard.

It is well known to those skilled in the art that during the color gamut improvement or adjustment process of an LCD panel, due to the limitation of the existing red color resistance and blue color resistance materials, the single pure color coordinate adjustment space is extremely limited, and it is difficult to adjust the color gamut by improving the red color or blue color resistance; and the space of green color resistance adjustment is very large, so the green purity is often improved by continuously improving the color coordinates of the green color resistance material to adjust or improve the color gamut of the panel. However, for the LCD panel with high color gamut in an RGBW display mode, due to the addition of W pixels for improving the brightness and under the coordination of high-purity green color resistance, an obvious greenish color difference often occurs when some intermediate colors are displayed, e.g., when green is mixed red into yellow with maximum brightness, the yellow is greenish instead of pure yellow. This greenish is mainly due to the fact that the stimulus value of green with maximum brightness is higher than that of red with maximum brightness in the yellow mixing process. For the same reason, other color difference such as greenish cyan and the like may also occur. Although the color difference can be adjusted through an algorithm, that is, the above problem of color difference is solved by reducing the brightness of green color resistance or adjusting the color mixing ratio of other colors, the problem of color difference cannot be fundamentally solved. Moreover, the algorithmic adjustment inevitably reduces the overall brightness of the panel, goes against the original intention of highlight of the RGBW display mode, and sacrifices the color purity of other colors at the same time.

According to an embodiment of the present disclosure, to improve the greenish problem of yellow light as an example, a photoluminescent material that can excite red light can be added to the variable color sub-pixels. When pure yellow needs to be formed by mixture, the backlight module collaboratively emits exciting light for exciting the photoluminescent material to emit light, and the variable color sub-pixels emit a red light component for complementing color mixing, thereby correcting the greenish phenomenon of yellow light without reducing the overall brightness of the picture or losing the color purity of other colors while ensuring a high color gamut.

The application of the present disclosure in color gamut conversion will be described in detail as below, using the conversion between an Adobe color gamut and a DCI color gamut as an example, wherein four RGBW sub-pixels constitute a pixel unit and the green light needs to be compensated. In the present disclosure, unless otherwise specified, the color coordinates are under a CIE1931 color gamut standard. This embodiment is for illustrative purposes only and should not be understood as limiting the present disclosure.

Figure 19:
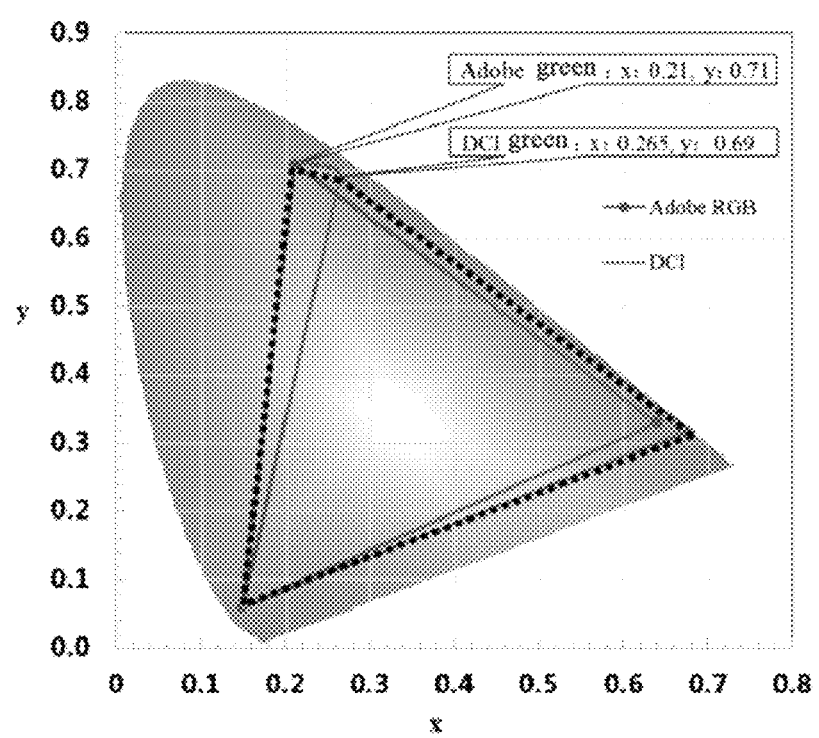
FIG. 19 is a color gamut diagram according to an embodiment of the present disclosure.

The original color gamut of the display panel in this embodiment satisfies a DCI color gamut matching rate of 100%, a DCI color gamut area ratio of 100%, an Adobe color gamut matching rate of 88.3% and an Adobe color gamut area ratio of 100.6%. Referring to FIG. 19, its most saturated monochromatic color coordinates of R/G/B are R(x: 0.680, y: 0.320); G(x: 0.265, y: 0.690); B(x: 0.150, y: 0.060). If the product is used for a TV and also applied in the professional printing field, it is required to have a good image information recovery capability. In this case, the color gamut is required to satisfy an Adobe color gamut area ratio of 108.8% and an Adobe color gamut matching rate of 100%, i.e., the most saturated monochromatic color coordinates of R/G/B are R (x: 0.680, y: 0.320); G (x: 0.21, y: 0.71); B (x: 0.150, y: 0.060). It can be clearly seen from FIG. 19 that the color gamut spaces represented by two different color gamut standards are not overlapped, and the main difference is the difference of green coordinates. The present disclosure adopts the structure device shown in FIG. 14, a photoluminescent material $Zn_2SiO_4$:Mn is used as the material of the variable color sub-pixels 21, the exciting light emitting unit 11 in the backlight could emit exciting light having the wavelength of 210 nm which could excite the photoluminescent material to emit a green light component with color coordinates (0.218, 0.712), this is different from that of green color resistance, the change of the luminescent intensity of green produced by excitation enables the green coordinates of the entire display panel to move along the dotted line in FIG. 19 (i.e., move from x:0.21, y:0.71 to x:0.265, y:0.69), so that the color gamut of the display panel is converted from a DCI color gamut to an Adobe color gamut. Conversely, if the exciting light emitting unit is turned off, the Adobe color gamut can be converted into the DCI color gamut. Through the above setting, the overall color gamut range of the display panel can be extended to the range represented by the dotted line in FIG. 19, so that the color gamut of the product can be a polygon rather than a triangle, and the product can be applied in both the professional printing field and the conventional high color gamut display field.

According to an embodiment of the present disclosure, whether the photoluminescent material in the variable color sub-pixels is excited is determined according to whether the color gamut needs to be converted. In some embodiments of the present disclosure, when the color gamut conversion function is opened, the green in one pixel lights up, and the corresponding variable color sub-pixel in the pixel is synchronously excited to emit a compensation light component required for color gamut conversion. In other embodiments of the present disclosure, a threshold may also be set according to the quantity or brightness (transmittance) of green sub-pixels turned on in a certain area, and it is determined that the green sub-pixels in the area contributes a lot to the picture. At the moment, the color gamut standard conversion function is opened to compensate the green light to promote the color gamut, so that the screen shows a richer color in this area. Of course, the color gamut conversion function may also be normally opened or normally closed according to actual needs, being normally closed is the original color gamut standard of the display device, and if it is normally opened, the color gamut standard is converted to another target color gamut standard.

According to an embodiment of the present disclosure, if a green sub-pixel in an area of certain picture information does not light up, that is, the light of the green component does not need to be compensated, it is not necessary at that time to excite the variable color sub-pixel to emit green light.

According to the embodiments of the present disclosure, the color gamut standard conversion is not limited to the adjustment on green coordinates, and red or blue color coordinates may also be adjusted according to different requirements, or a non-trichromatic luminescent material is directly added to realize conversion and expansion of the color gamut.

According to the embodiments of the present disclosure, in addition to the aforementioned conversion between the Adobe color gamut standard and the DCI color gamut standard, other color gamut standard conversion and color gamut area adjustment principles are the same as the above principles, that is, in the development phase of a product, one or more reasonable switchable target color gamuts are set according to needs, one or more optimal photoluminescent materials are reasonably selected according to the difference between the original color gamut standard of the display panel and the target color gamut standards, the photoluminescent materials can be excited to emit light of at least one of red, green, blue and yellow for color gamut conversion, or any other compensation color that can realize the conversion from the original color gamut standard of the display panel to the target color gamut standards, so that the color gamut conversion function is realized.

In the description of this specification, the reference terms "one embodiment", "some embodiments", "an example", "a specific embodiment" and the like mean that specific features, structures, materials or characteristics described in conjunction with the embodiments or examples are included in at least one embodiment or example of the present disclosure. In this specification, schematic expressions of the above terms are not necessarily directed to the same embodiment or example. Moreover, the specific features, structures, materials or characteristics described may be combined appropriately in one or more embodiments or examples. In addition, different embodiments or examples described in this specification and features of different embodiments or examples may be combined by those skilled in the art without conflict with each other.

Although the embodiments of the present disclosure have been shown and described above, it could be understood that the above-described embodiments are exemplary and cannot be understood as limiting the present disclosure. Changes, modifications, substitutions and variations may be made to the above embodiments by those of ordinary skill in the art within the scope of the present disclosure.

The invention claimed is:

1. A display device comprising a display panel which comprises:
   a display substrate;
   a plurality of pixel units arranged on a first surface of the display substrate, wherein each pixel unit comprises a plurality of sub-pixels and the plurality of sub-pixels comprise a variable color sub-pixel which is used for emitting light having at least one predetermined color according to a predetermined color gamut standard, wherein the variable color sub-pixels comprise at least one photoluminescent material selected from a reflective material, a fluorescent material, a self-luminous body and a phosphorescent material;
   an exciting light emitting unit which is used for emitting at least one kind of exciting light so as to excite the photoluminescent material to emit the light of the at least one predetermined color; and
   an exciting light selecting unit having a liquid crystal panel which is used for selecting the exciting light according to the light of the at least one predetermined color; said liquid crystal panel comprises a first electrode, a second electrode, a liquid crystal layer arranged between the first electrode and the second electrode, and data wires, and said liquid crystal panel is divided into a plurality of first adjustment light units and second adjustment light units, wherein an outline of each first adjustment light unit on the display substrate overlaps with an outline of one variable color sub-pixel from a perspective normal to the first surface of the display substrate, and an outline of each second adjustment light unit on the display substrate overlaps with an outline of at least one non-variable color sub-pixel from a perspective normal to the first surface of the display substrate, and said second electrode and data wires are arranged in an interlacing manner in a same layer.

2. The display device according to claim 1, wherein the exciting light emitting unit is at least one micro LED.

3. The display device according to claim 1, wherein the exciting light selecting unit is arranged between the exciting light emitting unit and the variable color sub-pixels or on one side of the variable color sub-pixels opposite to the exciting light emitting unit.

4. The display device according to claim 1, further comprising a backlight module, wherein the exciting light emitting unit is integrally formed with the backlight module.

5. The display device according to claim 1, wherein the pixel units comprise a red sub-pixel, a green sub-pixel, a blue sub-pixel and the variable color sub-pixel; or a red sub-pixel, a green sub-pixel, a blue sub-pixel, a yellow sub-pixel and the variable color sub-pixel.

6. A method for manufacturing the display device of claim 1, comprising a step of forming a display panel which includes:
   providing a display substrate;
   forming a plurality of pixel units on a first surface of the display substrate, wherein each pixel unit comprises a plurality of sub-pixels and the plurality of sub-pixels comprise a variable color sub-pixel which is used for emitting light having at least one predetermined color according to a predetermined color gamut standard; wherein the variable color sub-pixels comprise at least one photoluminescent material selected from a reflective material, a fluorescent material, a self-luminous body and a phosphorescent material;
   forming an exciting light emitting unit which is used for emitting at least one kind of exciting light so as to excite the photoluminescent material to emit the light of the at least one predetermined color; and
   forming an exciting light selecting unit having a liquid crystal panel which is used for selecting the exciting light according to the light of the at least one predetermined color; said liquid crystal panel comprises a first electrode, a second electrode, a liquid crystal layer arranged between the first electrode and the second electrode, and data wires, and said liquid crystal panel is divided into a plurality of first adjustment light units and second adjustment light units, wherein an outline of each first adjustment light unit on the display substrate overlaps with an outline of one variable color sub-pixel from a perspective normal to the first surface of the display substrate, and an outline of each second adjustment light unit on the display substrate overlaps with an outline of at least one non-variable color sub-pixel from a perspective normal to the first surface of the display substrate, and said second electrode and data wires are arranged in an interlacing manner in a same layer.

7. The method according to claim 6, wherein forming the variable color sub-pixels comprises:
   mixing the photoluminescent material with optical adhesive to obtain a raw mixture; and
   coating the raw mixture on the first surface of the display substrate to form the variable color sub-pixels.

8. The method according to claim 6, wherein forming the variable color sub-pixels comprises:
   coating the photoluminescent material or a mixture of the photoluminescent material and a columnar spacer material on the first surface of the display substrate; and
   coating an optical adhesive on the first surface of the display substrate successively to form the variable color sub-pixels.

9. A method for converting color gamut of a display device, wherein the display device comprises a display panel comprising a display substrate and a plurality of pixel units arranged on a first surface of the display substrate, each pixel unit comprises a plurality of sub-pixels and the plurality of sub-pixels comprise a variable color sub-pixel which is used for emitting light of at least one predetermined color according to a predetermined color gamut standard; wherein the variable color sub-pixels comprise at least one photoluminescent material selected from a reflective material, a fluorescent material, a self-luminous body and a phosphorescent material;
   an exciting light emitting unit which is used for emitting at least one kind of exciting light so as to excite the photoluminescent material to emit the light of the at least one predetermined color; and
   an exciting light selecting unit having a liquid crystal panel, which is used for selecting the exciting light according to the light of the at least one predetermined color; said liquid crystal panel comprises a first electrode, a second electrode, a liquid crystal layer arranged between the first electrode and the second electrode, and data wires, and said liquid crystal panel is divided into a plurality of first adjustment light units and second adjustment light units, wherein an outline of each first adjustment light unit on the display substrate overlaps with an outline of one variable color sub-pixel from a perspective normal to the first surface of the display substrate, and an outline of each second adjustment light unit on the display substrate overlaps with an outline of at least one non-variable color sub-pixel from a perspective normal to the first surface of the display substrate, and said second electrode and data wires are arranged in an interlacing manner in a same layer; and the method comprises:

determining an original color gamut and a target color gamut of the display device;

determining color of light emitting by the variable color sub-pixels according to the original color gamut and the target color gamut; and exciting the variable color sub-pixels to emit light, and converting the color gamut of the display device from the original color gamut to the target color gamut.

\* \* \* \* \*